(No Model.)
G. F. JOHNSON.
LAWN MOWER.
No. 251,890.            Patented Jan. 3, 1882.
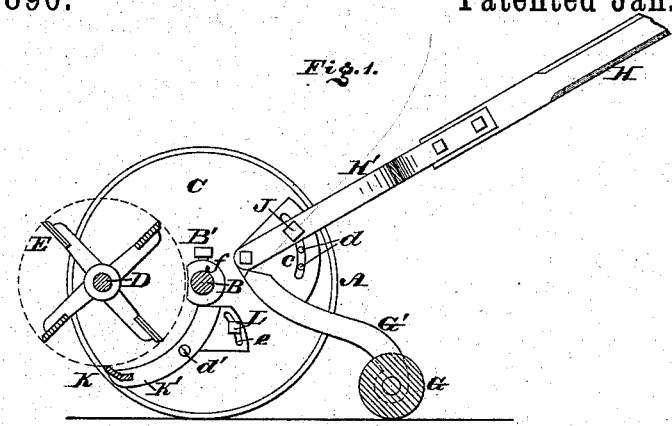
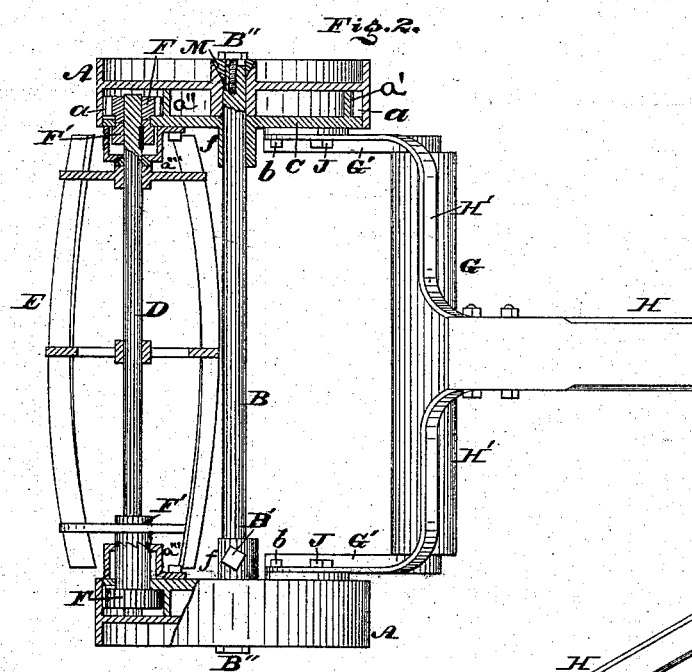
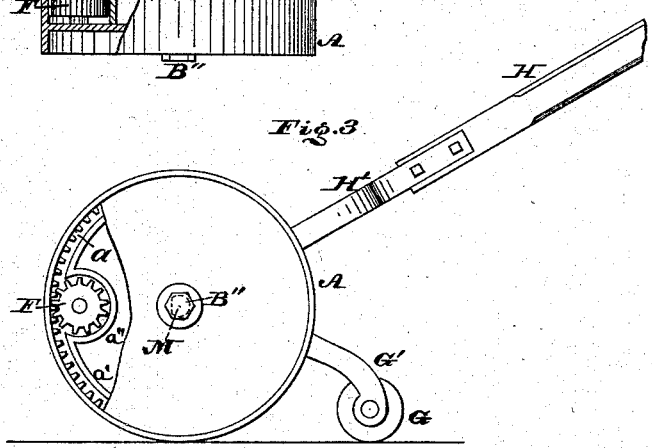
WITNESSES:
L. Douville
N. F. Kircher
INVENTOR:
Geo. F. Johnson,
BY John A. Diedersheim
ATTORNEY.
N. PETERS. Photo-Lithographer. Washington, D. C.

UNITED STATES PATENT OFFICE.

GEORGE F. JOHNSON, OF PHILADELPHIA, PENNSYLVANIA.

LAWN-MOWER.

SPECIFICATION forming part of Letters Patent No. 251,890, dated January 3, 1882.

Application filed July 19, 1881. (No model.)

*To all whom it may concern:*

Be it known that I, GEORGE F. JOHNSON, a citizen of the United States, residing at Philadelphia, in the county of Philadelphia and State of Pennsylvania, have invented a new and useful Improvement in Lawn-Mowers, which improvement is fully set forth in the following specification and accompanying drawings, in which—

Figure 1 is a vertical section of the lawn-mower embodying my invention. Fig. 2 is a top or plan view thereof, partly sectional. Fig. 3 is a side elevation of a portion thereof, partly broken away. Fig. 4 is a detached view of a portion thereof.

Similar letters of reference indicate corresponding parts in the several figures.

My invention relates to improvements in lawn-mowers; and it consists in providing the shaft of the rotary cutter with ratchet and pawl or clutch mechanism, which is located directly on said shaft, the loose wheel or pinion of said mechanism being fitted on the end of the shaft, so as to be on the outside of the fixed ratchet of said mechanism, whereby, when the mower is run back, the loose pinion slides freely on the end of the shaft without being obstructed by nuts, collars, &c., on said end, and is controlled by the web of the driving-wheel. By this construction, also, the mower may be set up in a most convenient manner, and there are a simplification of parts and reduction of expense of the mower.

The invention also consists of means for guarding the teeth of the driving-wheel and loose pinion, and in inclosing the fixed ratchet by a box, which also acts as a bearing for the shaft of the rotary cutter.

The invention also consists of means for adjusting both the handle and roller of the mower.

Referring to the drawings, A represents the driving-wheels of the mower, and B the axle thereof, the inner faces of the rims *a* of said wheels A being toothed, forming gear-wheels. C represents boxes, which are fitted within the wheels A, on the inner sides thereof, and securely connected to the axle B, and form the bearings for the shaft D of the rotary cutter E of the mower.

On each end of the shaft D is loosely fitted a pinion, F, each meshing with a toothed rim, *a*, of the respective driving-wheel A.

To the shaft D are rigidly connected ratchets F', one for each pinion F, the teeth of said ratchets being on their vertical sides, so as to engage with said pinions F, whose adjacent sides are likewise toothed; but the teeth of the ratchets may be formed on the periphery thereof, and the pinions F may carry pawls instead of having toothed sides; but in either case the loose pinions with teeth or pawls and the fixed ratchets are all fitted on the shaft D.

When the mower is advanced the driving-wheels A operate the pinions F, and power is communicated to the shaft D, and consequently to the rotary cutter. When the mower is run back the pinions ride freely over the ratchets F', and thus the rotary cutter is inoperative.

By the location of the ratchet and pawl or clutch mechanism on the shaft of the rotary cutter the latter may be quickly operated and rendered inoperative. There are a saving of wheels and shafts, lessening of noise, simplification of the mower, and reduction of expense.

G represents the roller, and H the handle, of the mower. The roller is pivoted to the boxes C or frame of the mower by the bolts *b*, which pass through the arms G' of the roller and also the braces H' of the handle to the mower. The upper ends of the sustaining-arms G' of the roller are widened and formed with segmental slots *c*, in which enter bolts J, which are passed through the braces and fitted to openings *d*, formed in curvilinear order in the boxes behind the segmental slots. It will be seen that by loosening the bolts J the height of the roller and position of the handle may be adjusted as required, the arms of the roller and braces of the handle turning on the bolts *b* as axes. When the adjustment is accomplished the bolts J are tightened, serving to clamp the arms of the roller and braces of the handle to the boxes C and hold them firmly in place.

K represents the bed-knife, which is connected to arms K', which are pivoted to the boxes C or frame of the mower, as at *d'*, and their upper ends are widened and formed with segmental slots *e*, in which are passed bolts L, which screw into the boxes C. By loosening the bolts L the knife may be raised or lowered, the arms K' turning on the pivots *d'*. When the adjustment is completed the bolts L are tightened and the arms K' thus clamped to the boxes C, whereby the bed-knife remains firmly in position. The boxes C are securely connected to the axle B, as has been stated, for which purpose I employ bolts B', which are passed through the bosses or hubs f of said boxes and tightened against the axle. The driving-wheels A are held in position by bolts B'', which enter the ends of the axle. Consequently when the wheels and boxes are worn the bolts B' B'' are loosened, and said former parts moved closely toward each other, after which the bolts are tightened and the parts are again firm and operative.

It will be noticed that the pinions F are in the spaces between the upright plates of the boxes C and the spokes or webs of the driving-wheels. Springs may be employed for holding the pinions F against the ratchets F'; but the pinions will ordinarily engage with the ratchets by the shaking of the mower, and when they are in contact they interlock and remain so during the forward motion of the mower. The spokes or webs of the wheels limit the outward play of the pinions in running back the mower, and prevent displacement of the same from the shaft D.

Among the advantages of the present invention are the simplicity of the ratchet mechanism, the employment of a short shaft, the ease of putting together the parts of the machine, and the inexpensiveness of the machine as a whole.

It will be seen that the loose wheel F and fixed ratchet F' are placed side by side on the shaft D, the former being on the outside. When the ratchet is secured to said shaft D the boxes C are fitted to the axle B. The loose wheels F are then simply slipped on the ends of the shaft D, and the driving-wheels applied to the axle and secured thereon, the outer parts of the mower having been or being subsequently attached in position. It will now be seen that the wheels or pinions F are loose on the ends of shaft D, said ends being unobstructed by sleeves or nuts, so that said pinions have full play in the longitudinal direction of the shaft and move fully from the fixed ratchets when the mower is run back. The limit of motion or play of the pinions is the webs of the driving-wheels A.

Another advantage of the invention is the inclosure of the teeth of the rims a of driving-wheels A and of the pinions F, so that oil, dirt, &c., working through the axle cannot reach said teeth, and grass and dirt reaching the teeth cannot reach the axle. This is accomplished by a rim, a', which is cast with or secured to the side of the box C, and extends laterally toward the web of the driving-wheel, so as to inclose the toothed rim; and the rim is segmental, as at a'', so as to inclose the pinion F. Should grass or dirt reach said pinion, the guard a' a'' prevents it passing to the hub of the driving-wheel. Should dirt, &c., drop from the axle on the inner end of the hub, it will fall on the inner face of the rim a' a'', so that in either case by removing the driving-wheel A the rim a'.a'' may be cleansed, and the pinions F slipped off and the obstruction removed. Furthermore, the teeth of the ratchet mechanism are also guarded by boxes a''', which are bolted to the inner faces of the boxes C, so as to inclose the fixed ratchets F' and assist in forming bearings for the shaft D of the rotary cutter, as more clearly shown in Fig. 2.

M represents conical washers, which are fitted on the ends or journals of the axle B, within the hubs of the driving-wheels, the inner faces whereof are also conical. A portion of the opening of each washer is flat, to accord with a similar portion on the journal, whereby the washer is prevented from turning. It is evident that when the hubs and journals of the wheels are worn the wheels may be moved up and tightened by forcing in the conical washers M and holding them by the bolts B''. The washers also close the outer ends of the hubs and prevent grass, &c., passing in between the wheels and axle.

Having thus described my invention, what I claim as new, and desire to secure by Letters Patent, is—

1. In a lawn-mower, the rotary cutter and its shaft and the driving-wheel, in combination with the ratchet or clutch mechanism consisting of a fixed ratchet and a loose pinion located side by side, both on said shaft, the pinion being on the outside and adapted to slide on the shaft, the driving-wheel limiting the sliding movement, substantially as set forth.

2. The driving-wheel with its toothed rim and the engaging-pinion, in combination with the box C, having a laterally-projecting rim, a', the portion a'' whereof is segmental, substantially as set forth.

3. The driving-wheel A, box C, rotary cutter E and its shaft D, and the ratchet mechanism, in combination with the box a''', secured to box C and inclosing the fixed part of said mechanism, and acting as bearings for said shaft, substantially as set forth.

4. The roller G, provided with arms G', the upper widened parts of which have segmental slots c, in combination with the bolts b J, the handle-braces H', and the boxes C, having curvilinear series of holes d, substantially as set forth.

GEO. F. JOHNSON.

Witnesses:
JOHN A. WIEDERSHEIM,
GEORGE L. PLITT.